United States Patent
Machida et al.

[11] 3,875,988
[45] Apr. 8, 1975

[54] MULTIPLE EFFECT EVAPORATOR APPARATUS

[75] Inventors: Shunichi Machida; Masaharu Tsujita; Shintaro Nakaya; Ryoji Ueno, all of Tokyo, Japan

[73] Assignee: Ebara Manufacturing Co., Ltd., Tokyo, Japan

[22] Filed: Feb. 23, 1973

[21] Appl. No.: 335,095

[30] Foreign Application Priority Data
Feb. 25, 1972 Japan................. 47-19480

[52] U.S. Cl.............. 159/13 A; 159/18; 202/174
[51] Int. Cl......... B01d 1/22; B01d 3/02; B01d 1/26
[58] Field of Search....... 159/18, 13 A, 13 R, 2 MS, 159/28 A, 14; 202/174, 173; 165/108, 113, 114; 203/11

[56] References Cited
UNITED STATES PATENTS

| | | | |
|---|---|---|---|
| 466,862 | 1/1892 | Lillie | 159/13 A |
| 1,049,425 | 1/1913 | Webre | 159/28 A X |
| 1,424,992 | 8/1922 | Creightor | 159/27 |
| 2,114,873 | 4/1938 | Coulson, Jr. | 165/113 |
| 2,750,999 | 6/1956 | De Vries | 159/18 |
| 3,303,106 | 2/1967 | Standford, Jr. | 159/18 X |
| 3,487,873 | 1/1970 | Bromley et al. | 159/18 |
| 3,578,004 | 5/1971 | Bromley | 159/13 A |
| 3,702,807 | 11/1972 | Newson et al. | 203/11 X |

FOREIGN PATENTS OR APPLICATIONS

| | | | |
|---|---|---|---|
| 893,633 | 4/1962 | United Kingdom | 159/13 A |
| 202,722 | 7/1956 | Australia | 159/13 A |
| 520,064 | 4/1940 | United Kingdom | 159/18 |

Primary Examiner—Jack Sofer
Attorney, Agent, or Firm—Oblon, Fisher, Spivak, McClelland & Maier

[57] ABSTRACT

Multiple effect evaporator apparatus includes a plurality of evaporator chambers, a plurality of thin-film flow-down type vertical heat exchange tubes the ends of which are connected to partition plates which divide the apparatus into the various evaporator chambers, a vessel disposed above the heat exchange tubes for receiving a solution, pressure difference maintaining means and solution distributing means interposed between the vessel and heat exchange tubes whereby evaporation and uniform distribution of the solution is facilitated, and means to facilitate the directional flow of the non-condensed gas through the chambers so as to prevent stagnation of the gas therein, such means being either asymmetrically located or centrally located with respect to the chambers and including passage means to interconnect the evaporator chambers.

8 Claims, 3 Drawing Figures

3,875,988

MULTIPLE EFFECT EVAPORATOR APPARATUS

BACKGROUND OF THE INVENTION

1. Field of the Invention

The present invention relates generally to evaporator apparatus and more particularly to multiple effect evaporator apparatus employing thin film flow-down type heat exchange tubes for concentrating a solution.

2. Description of the Prior Art

In conventional multiple effect evaporator apparatus having a plurality of evaporator chambers which are respectively equipped with a plurality of vertical heat exchange tubes and a vessel for receiving a solution placed above the heat exchange tubes, the vapor evaporated within an upper chamber is separated from the unvaporized solution and is circulated within a lower evaporation chamber around the heat exchange tubes so as to be used as a heat source while the unevaporized solution is conducted downwardly through the vessel of the lower chamber, passed through a pressure difference maintaining means and a distribution means to the heat exchange tubes within the chamber. When the solution is passed through the pressure difference maintaining means, the vapor pressure is consequently reduced. Accordingly, the solution may be evaporated at a temperature which is lower than the evaporation temperature within the upper chamber.

The vapor supplied to the evaporator chambers naturally contains non-condensed gas whereby the concentration of such non-condensed gas within the evaporator chambers is relatively increased depending upon the condensation of the vapor by discharging heat to the heat exchange tubes. When however, the concentration of the non-condensed gas is thus increased, the flow of fresh vapor is disturbed so as to decrease the evaporation coefficient. This is especially true in the conventional multiple effect evaporator apparatus wherein a plurality of heat exchange tubes are provided at the center of the evaporator chamber, and consequently vapor flows from the peripheral portion of the chamber toward the center, whereby the non-condensed gas is maintained or stagnated relative to a group of heat exchange tubes. In order to rectify such deficiencies, the conventional apparatus further includes a pipe for discharging the non-condensed gas, one end of which extends to the center of the group of heat exchange tubes, however, such structure is complicated and ineffective.

SUMMARY OF THE INVENTION

Accordingly, it is an object of the present invention to provide an improved multiple effect evaporator apparatus.

Another object of the present invention is to provide an improved multiple effect evaporator apparatus which is simple and economical to construct and operate. Still another object of the present invention is to provide an improved multiple effect evaporator apparatus which has a high evaporation coefficient.

Yet another object of the present invention is to provide an improved multiple effect evaporator apparatus which imparts a directional flow to the vapor so as to prevent stagnation of the non-condensed gas.

A further object of the present invention is to provide an improved multiple effect evaporator apparatus which provides uniform thermal loading of the heat exchange tubes.

The foregoing objectives are achieved according to this invention through the provision of a multiple effect evaporator having a plurality of evaporator chambers, a plurality of thin-film flow-down type vertical heat exchange tubes the ends of which are connected to partition plates which divide the apparatus into the various evaporator chambers, a vessel disposed above the heat exchange tubes for receiving a solution, pressure difference maintaining means and solution distributing means interposed between the vessel and the heat exchange tubes whereby evaporation and uniform distribution of the solution is facilitated, and means to facilitate the directional flow of the non-condensed gas through the chambers so as to prevent stagnation of the gas therein, such means being either asymmetrically located or centrally located with respect to the chambers and including passage means to interconnect the evaporator chambers.

BRIEF DESCRIPTION OF THE DRAWINGS

Various other objects, features, and attendant advantages of the present invention will be more fully appreciated as the same becomes better understood from the following detailed description when considered in connection with the accompanying drawings in which like reference characters designate like or corresponding parts throughout the several views, and wherein.

DETAILED DESCRIPTION OF THE PREFERRED EMBODIMENTS

Figure 1:
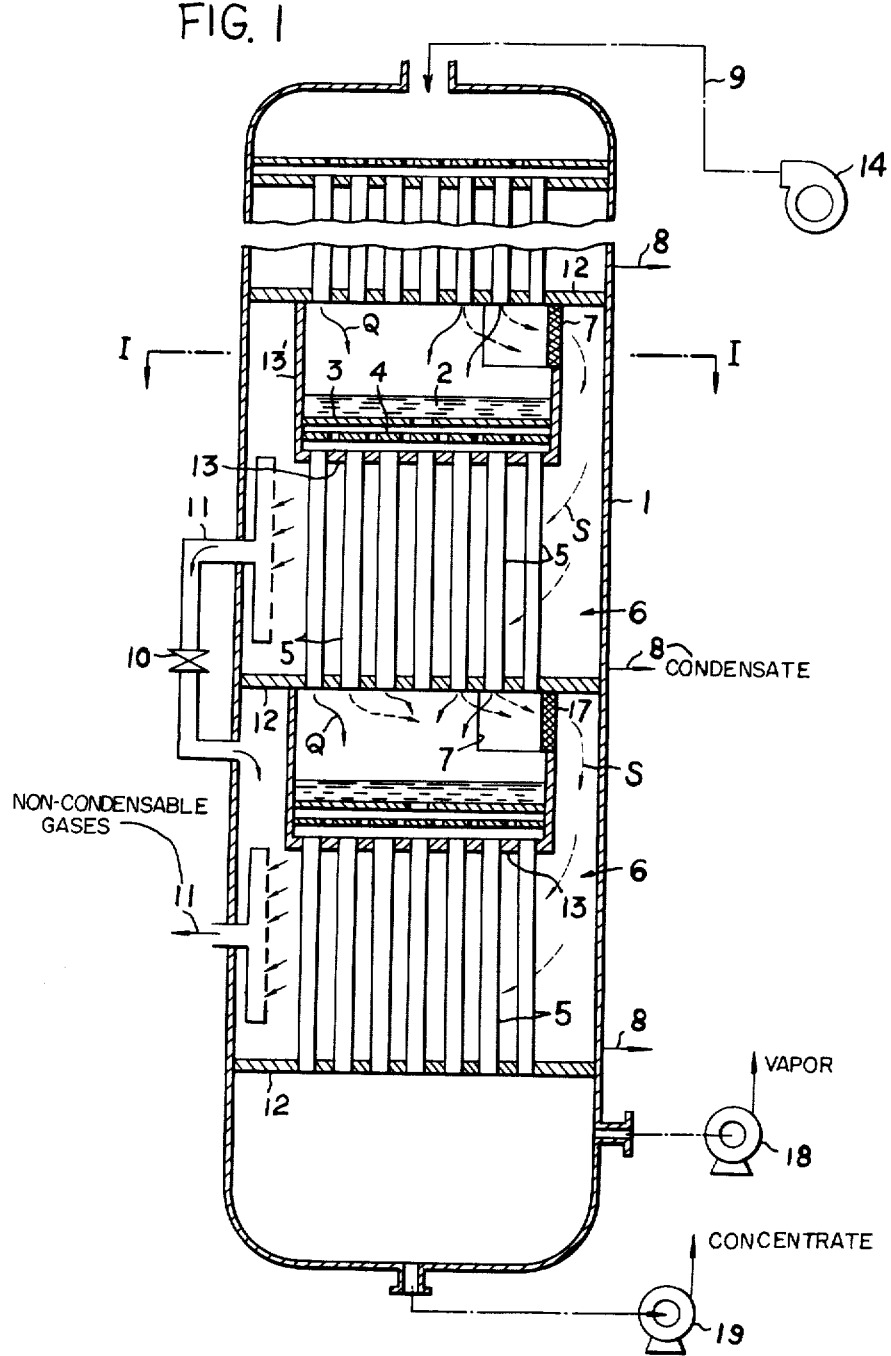
FIG. 1 is a sectional elevation view of one embodiment of a multiple effect evaporator apparatus constructed according to this invention.

Referring now to the drawings, and more particularly to FIG. 1 thereof, a plurality of evaporator chambers 6 are formed within a cylindrical shell 1 by means of partition plates 12 and 13. A plurality of vertical heat exchange tubes 5 are interposed between plates 12 and 13 and a vessel 2 for supplying a heated solution through a pressure difference maintaining means 3 and a solution distributing means 4 is mounted above the tubes 5. The vessel 2 is formed by a side wall 13' and plate 13, a part of the side wall 13' being secured to the plate 12 of chamber 6 so as to inhibit the vapor flow from the heat exchange tubes 5 of chamber 6 while a vapor inlet aperture 7 is formed within another portion of side wall 13' which terminates short of plate 12 thereby affording access from vessel 2 into the evaporator chamber 6.

The vapor is conducted through the vapor inlet aperture 7 into the evaporator chamber 6 in an asymmetrical flow pattern toward the center of the chamber 6 from one side of chamber 6 whereby the vapor passes from one side of the group of heat exchange tubes to the opposite side of the tubes so as to condense, and a vapor-liquid separating means 17 may be mounted at the vapor inlet aperture 7. The pressure difference maintaining means 3 and the solution distributing means 4 are separately formed for reducing the pressure of the condensed solution and for distributing the solution into the heat exchange tubes 5. The means for reducing the pressure of the condensed solution is a partition having an iris-type outlet hole within the vessel located at a position which is covered with the solution.

The uniform distribution means 4 characterized by a low pressure loss is secured to the upper ends of the heat exchange tubes 5 while the partition 3 having the iris-type outlet hole is mounted above the distribution means 4. The structure for separately providing the iris-type outlet hole for reducing the pressure of the condensed solution which is sealed within the vessel 2 and the distributing means having low resistance is quite effective for application to the vertical multiple effect evaporator type apparatus having thin film type heat exchange tubes.

Figure 2:
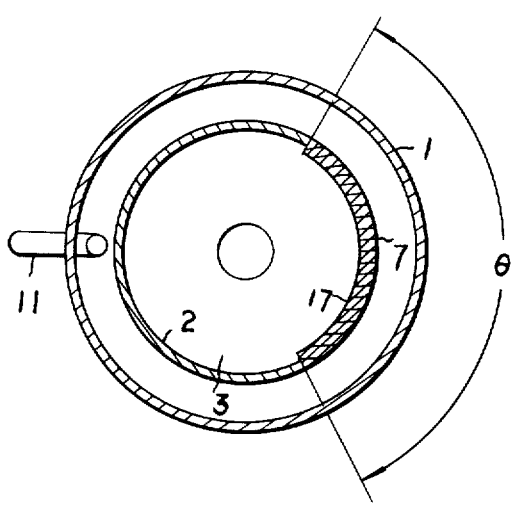
FIG. 2 is a sectional view taken along the line I — I of FIG. 1.

Diametrically opposite the vapor inlet aperture 7, there is further provided a vapor flow passage 11 which is open to the evaporator chamber 6 and is also connected to another evaporator chamber 6 through means of a control valve 10 which is disposed within the vapor flow passage 11. An outlet pipe 8 is provided at the bottom of each chamber 6 for exhausting the condensed liquid while a solution feed pipe 9 supplies the solution to the upper portion of the apparatus through means of a pump 14. The original solution Q enters the vessel 2 while a vapor flow S flows from vessel 2 around tubes 5. The vapor inlet aperture 7 comprises a sector of vessel 2 and the angle encompassed by the aperture sector is designated $\theta$. An evaporator ratio, which is the ratio of the rate of evaporation within the heat exchange tubes 5 to the rate of vapor flow from the chamber 6, is dependent upon the angle $\theta$ and may be increased by decreasing the angle $\theta$ of the vapor inlet aperture 7. (See FIG. 2).

If the angle $\theta$ of the vapor inlet aperture 7 is increased so as to permit vapor flow from the entire circumferential portion of the plate 12, the non-condensed gas will remain within the vicinity of the heat exchange tubes 5 so that a flow of vapor is prevented and the rate of vapor flow which is not condensed and conducted through the vapor flow passage 11 is increased whereby the evaporation ratio is decreased. The desired angle $\theta$ of the vapor inlet aperture 7 should thus be considered if it is desired to obtain a particular vapor flow or evaporation ratio.

The vapor S evaporated within an upper chamber is separated from the unevaporated solution Q which is disposed above the vessel of a lower chamber, and is conducted through the evaporator chamber 6 so as to circulate around the heat exchange tubes 5 whereby the vapor is utilized as a heat source. On the other hand, the unevaporated solution Q is received within the vessel of the lower chamber and is conducted through the pressure difference maintaining means 3 and the distributing means 4 to the inner portions of the heat exchange tubes 5 of the lower chamber. When the unevaporated solution Q is passed through the pressure difference maintaining means 3, the pressure therein is reduced so that the solution can be evaporated at a temperature which is lower than the evaporation temperature within the upper chamber. The vapor flow S is conducted from the vapor inlet aperture 7 whereby the vapor S is supplied to the chamber 6, the flow being asymmetrical with respect to the center of the cylindrical shell 1 wherein the vapor flow S is conducted from one side of the group of heat exchange tubes 5 to the other side thereof so as to be progressively cooled and condensed. Accordingly, the concentration on non-condensed gas contained within the vapor flow S is relatively increased and the non-condensed gas is discharged from the vapor flow passage 11 provided within the shell of the lowermost chamber.

Within the gas discharged from the vapor-flow passage 11, there may be a remainder portion of the vapor which is contaminated, in which case the gas is supplied to the lowermost chamber so as to recover the heat of the vapor whereupon such vapor is subsequently exhausted via the vapor-flow passage 11 by means of a vacuum pump. It is noted that the stagnation of the non-condensed gas can be prevented by merely modifying the shape of the side wall 13' of the vessel 2 so as to appropriately form the vapor inlet aperture 7 and by providing the vapor-flow passage 11 near the peripheral shell of the apparatus. In this manner, the construction costs are remarkably reduced.

It is noted further that within the multiple effect evaporator apparatus of the present invention, the side wall of the vessel mounted above the heat exchange tubes is formed in an asymmetrical fashion so as to induce a directional vapor flow pattern to the vapor conducted to the group of heat exchange tubes and to prevent the stagnation of the non-condensed gas around the heat exchange tubes whereby the evaporation coefficient is remarkably improved, while the thermal load upon the heat exchange tubes is uniform. The vapor flow is thus caused to flow toward the vapor flow passage and is simultaneously cooled and condensed so as to decrease the rate of vaporization. The number of heat exchange tubes may also be decreased so that all of the heat exchange tubes have a substantially uniform recuperative efficiency. Moreover, the vapor flow passage can be disposed near the shell of the apparatus whereby the apparatus can be remarkably simplified, compact, and easily assembled. Standardization of the apparatus can also be advantageously attained.

Pumps 18 and 19 remove respectively the non-condensable gases and the concentrate.

Figure 3:
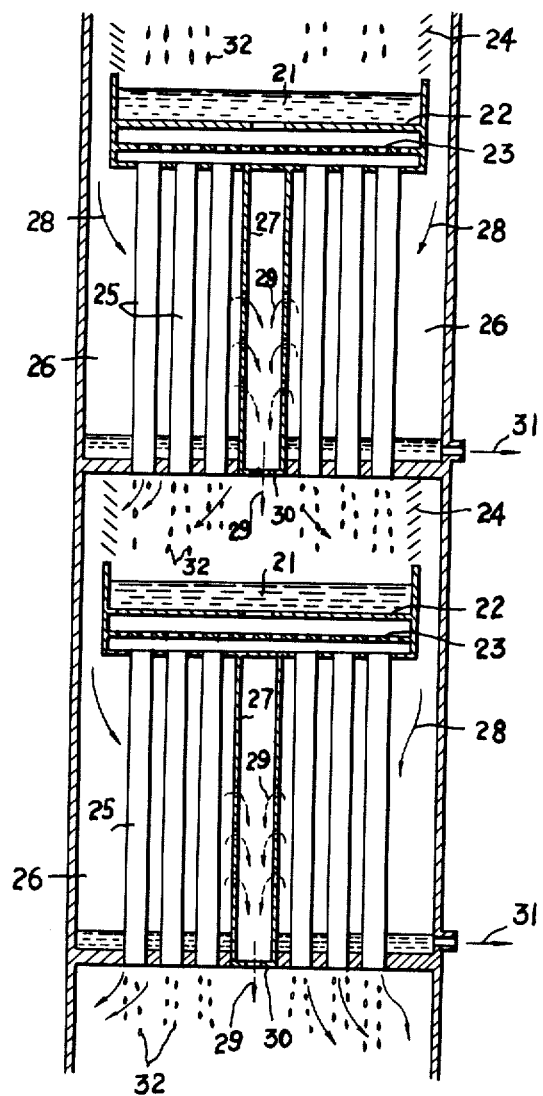
FIG. 3 is a sectional elevation view of another embodiment of a multiple effect evaporator apparatus constructed according to this invention.

Referring now to FIG. 3, another embodiment of a multiple effect evaporator apparatus is shown. In this embodiment, the vapor flow passage, which is an outlet for the non-condensed gas, is formed at the center of the heat exchange tubes and includes an iris-type exit means. Consequently, the solution Q flows downwardly from an upper set of heat exchange tubes 25 and is received within a vessel 21, at the bottom of which is a pressure difference maintaining means 22 which is sealed so as to maintain the pressure difference with respect to the lower chamber. A solution distributing means 23 is disposed below the pressure difference maintaining means 22, whereby the solution Q is passed through both of the means 22 and 23 and is conducted downwardly within the heat exchange tubes 25 so as to be evaporated. The vapor 28, which is evaporated within the heat exchange tubes 25, is then passed through the vapor-water separator 24 and into another evaporator chamber 26 wherein the vapor is used as a heating source for the heat exchange tubes 25.

The cooled vapor is condensed and removed from the chamber 26 by means of an outlet 31, while the remaining solution Q is received within the vessel 21 of the next chamber wherein it is progressively evaporated. The non-condensed gas 29 remaining within the evaporator chamber 26 is of course conducted downwardly through a plurality of fine holes disposed within a tube 27 which is located at the center of the group of heat exchange tubes 25 whereupon the gas is subsequently passed through the iris-type means 30 formed within the lower end of the tube 27 so as to supply the next chamber 26 with vapor, the tube 27 of course being similar to the vapor flow passage 11. The fine hole means may include various openings such as for example, small round holes, other shaped holes, for example, slits, or the like.

The non-condensed gas is easily stagnated around the center tube 27, and consequently, such stagnation of the non-condensed gas can be easily and effectively prevented by the utilization of the fine holes, which also act as pressure difference maintaining means, whereby an excellent heat transferring effect can be attained. The pressure difference is attained by appropriately forming the fine holes such that the smaller diameter holes are above the larger diameter holes. It is also possible to control the leakage of the vapor from the vapor flow passage 27 by employing a variable iris means, such as a hand valve or a control valve, instead of the fixed iris means. The pressure difference between an upper chamber and a lower chamber can be suitably maintained by appropriately forming the iris means, and the non-condensed vapor, together with the non-condensed gas conducted to the gas discharge tube of the vapor flow passage, can be supplied to the lower chamber under a reduced pressure so as to effectively recover the heat of the vapor.

Since the vapor flow passage of the non-condensed gas discharge tube is formed at the center of the heat exchange tubes and the iris means is formed at the end of the outlet of such discharge tube, the non-condensed gas normally stagnated around the heat exchange tubes, inhibiting the heat transferring effect, is uniformly discharged so as to in fact increase the heat transferring effect. Moreover, the pressure difference between an upper chamber and a lower chamber is desirably maintained and the heat recovery is improved so as to provide a high level of vapor condensation.

Obviously, many modifications and variations of the present invention are possible in light of the above teachings. It is to be understood therefore that within the scope of the appended claims the present invention may be practiced otherwise than as specifically described herein.

We claim:

1. A multiple effect evaporator comprising:
 a vertically oriented cylindrical shell;
 a plurality of superposed chambers in said shell formed by horizontally disposed, vertically spaced tubesheets;
 a vertical heat exchange tube bundle provided within each of said chambers for the serial passage through said tube bundles of a solution to be evaporated, the lower ends of said tubes being fixed within said tubesheets;
 vessel means, disposed upon the upper ends of each of said tube bundles, provided within each of said chambers for receiving a heated solution and vapor from the lower ends of said tubes of the immediately preceding bundle of heat exchange tubes and which vessel means fluidically communicates, through a pressure difference maintaining means for maintaining a pressure difference between the pressure within said vessel means and that within the immediately succeeding vessel means and a solution distribution means disposed below said pressure difference maintaining means and above said upper ends of said tubes for defining a solution containing chamber between said distribution means and said tubes, within said vessel means, so as to uniformly distribute said solution into a succeeding bundle of heat exchange tubes, and through said succeeding bundle of heat exchange tubes, with said succeeding vessel means therebelow for conducting the resulting amount of said solution to said succeeding vessel means so as to evaporate said solution within said succeeding bundle of heat exchange tubes and to condense the major portion of said vapor from said preceding bundle of tubes about the tubes of said succeeding bundle, said vapor being used as a heat source, and including separating means for separating said vapor from said solution and for conducting said separate vapor from said preceding bundle of heat exchange tubes into said respective chamber containing said succeeding bundle; and
 a plurality of vapor and non-condensable gas flow passageway means for successively interconnecting the condensing portions of said chambers for causing a directional vapor flow in conjunction with said separated vapor flow from said vapor separating and conducting means about each of said bundles of heat exchange tubes within each of said condensing chambers and for conducting said flow from a preceding condensing chamber to a succeeding condensing chamber for increasing the heat exchange coefficient of said heat exchange tube bundles by preventing the stagnation of the non-condensed gas around said tubes.

2. A multiple effect evaporator as set forth in claim 1, wherein said vapor flow passageway means are located at the center of each said condensing chambers so as to attain a uniform distribution of vapor throughout said chambers.

3. A multiple effect evaporator as set forth in claim 1, wherein said vapor flow passageway means are asymmetrically located within a side wall of each of said condensing chambers so as to attain a uniform distribution of vapor flow throughout said chambers.

4. A multiple effect evaporator as set forth in claim 1, wherein said passageway means include iris means for controlling the pressure difference between said chambers.

5. A multiple effect evaporator as set forth in claim 1, wherein said plurality of chambers are vertically aligned.

6. A multiple effect evaporator as set forth in claim 1, wherein said vapor and non-condensable gas flow passageway means include a plurality of fine holes permitting non-condensable gases and a minor portion of vapor to flow therethrough from one of said condensing chambers to the next of said condensing chambers.

7. A multiple effect evaporator as set forth in claim 6, wherein said fine holes of said vapor flow passageway means are used as pressure difference maintaining means.

8. A multiple effect evaporator as set forth in claim 7, wherein the diameters of the upper ones of said fine holes are smaller than that of the lower ones of said fine holes.

* * * * *